April 16, 1940.    J. BIJUR    2,197,247
LUBRICATION
Filed June 3, 1935
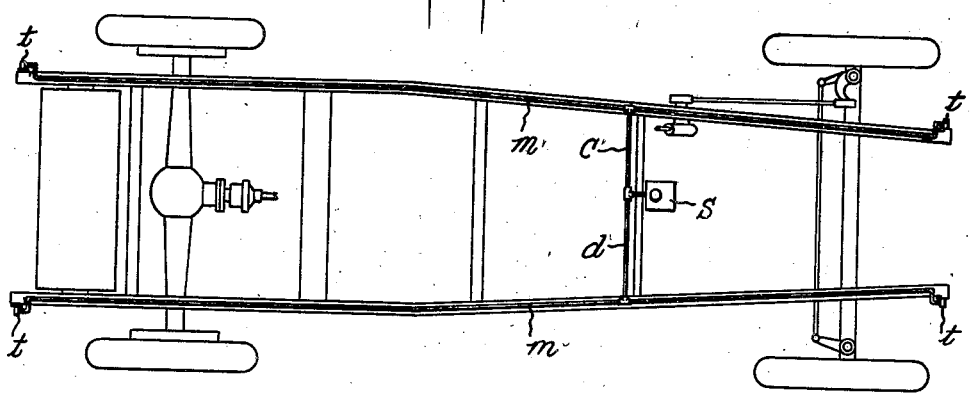
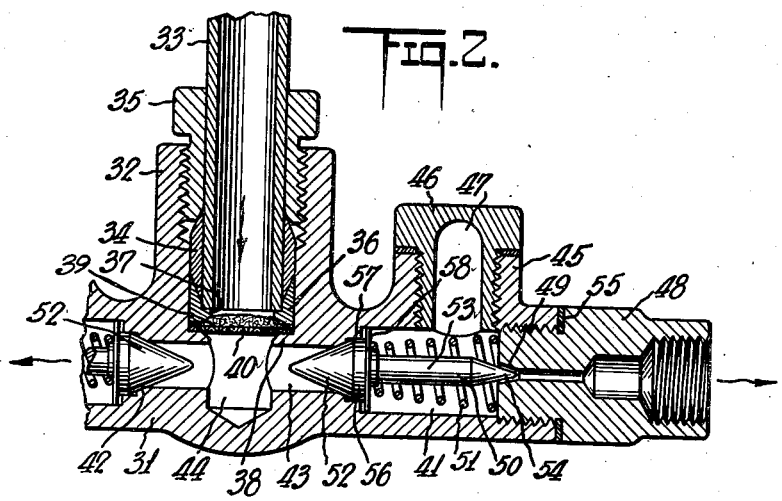
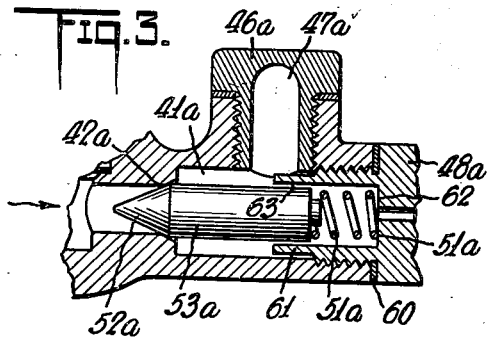 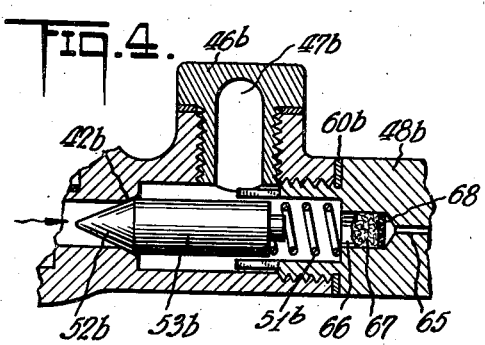
INVENTOR
Joseph Bijur, Deceased
by George Bijur, Executor
BY
ATTORNEYS Patented Apr. 16, 1940

2,197,247

UNITED STATES PATENT OFFICE 2,197,247

LUBRICATION

Joseph Bijur, deceased, late of New York, N. Y., by George Bijur, executor, New York, N. Y., assignor to Auto Research Corporation, a corporation of Delaware Application June 3, 1935, Serial No. 24,651

1 Claim. (Cl. 184—7)

The present invention relates to remote control lubrication and is concerned primarily with systems and installations and the constituent elements thereof for lubricating one or more bearings on a machine or group of machines from a readily accessible point or points of control.

The invention has its preferred application to the lubrication of the bearings of industrial machinery and also of the bearings on the chassis of a motor vehicle, such as an automobile or a motor truck.

The invention from one aspect is concerned with that type of lubricating system in which the outlet controls in advance of the various bearings are measuring valves actuated concurrently by pressure transmitted through oil-filled connecting piping, from a single centralized point of control.

It may be noted that in a system of the general type mentioned, if dirt should lodge at one of the valves in such manner as to prevent complete closing of the supply line from atmosphere therebeyond and if the pipe line also has communication with atmosphere elsewhere either at the pump, or due to looseness at another fitting or junction in the line, there is a tendency for the pipe line and even for the entire contents of a supply reservoir mounted at high level, to become drained.

It is among the objects of the invention to provide a system or installation of the type mentioned, which shall reliably deliver predetermined charges of oil at each outlet, whenever operated at the central source, without depending on any special precautions in such operation, and which shall not be subject to derangement by the entry of dirt or chips in the pipe.

To accomplish this result, there is interposed in advance of the seats of the various measuring valve units, appropriate strainers, preferably each embodied with the measuring valve and serving to intercept scale or chips carried with the oil and of mechanical strength sufficient to endure the pressure thereon in the operation of the measuring valves. The strainer is sufficiently dense to intercept solid particles, but not so dense as to greatly augment the pressure at the pump required to operate the measuring valves.

A manually and/or automatically actuated central pump and reservoir unit may be provided to feed the measuring valve units. A filter may be provided at the pump to intercept any particles in the oil and thereby avoid the likelihood of clogging the strainers at the measuring valves.

A check valve at the outlet might prevent draining of the reservoir, but on the other hand, might seriously interfere with the operation of the system, particularly where the closing of a pump outlet check valve after the end of the pump pressure stroke would prevent release of the pressure on the pipe line, so that the valve plungers would not return promptly under the pressure of their springs, but would remain at their outlets.

It is among the further objects of the invention, therefore, to provide a system of the type mentioned in which while the reservoir is adequately guarded against draining, even though located at high level, the line will not become pressure bound, though measuring valves of the type last mentioned are employed.

This result is accomplished with the preferred measuring valves having air bell measuring compartments, by the simple expedient of providing an outlet seat of very small area for the measuring valve plunger, so that, after the plunger has been entrained to the outlet seat by the initial rush of oil in the operation of the pump and the rate of flow of oil into the measuring valve has decreased as the air bell becomes partly charged, the effective oil pressure tending to maintain the plunger against the outlet seat is so low as to be overcome by the pressure of the valve plunger return spring. The plunger thereafter floats between its inlet and outlet seats during the rest of the pump stroke and is spring-urged to the inlet seat when flow through the supply line ceases.

According to one embodiment of the present invention, the pump may be provided with a discharge pressure bell (not shown) adjacent thereto, preferably embodied in a unitary structure therewith and in which the oil discharge or a substantial part of the oil charge ejected by the pump is temporarily stored, either against the compressive resistance of air or of a spring-pressed plunger, the pressure bell thereupon exerting pressure automatically sustained until the charge has been propelled through the pipe line and such pressure may endure, especially if the lubricant is highly viscous, or if high resistance drip plug outlets are used in parallel to the measuring valve units, for a considerable interval after the manual effort has ceased.

In the accompanying drawing in which are shown a number of various possible embodiments of the several features of the invention, Fig. 1 is a diagrammatic view of an automobile chassis provided with the lubricating installation of the present invention, Fig. 2 is a fragmentary view on an enlarged scale of one embodiment of measuring valve unit, and Figs. 3 and 4 are fragmentary views of two modified forms of measuring valve units of the general structural type of that shown in Fig. 2.

Referring now to the drawing, in Fig. 1 there is shown diagrammatically the general layout of the chassis of an automobile having a lubricant supply unit S, illustratively on the dashboard. The distributing system includes headers c and d, which communicate at their ends with the respective mains m extending the length of the channel frames and feeding various bearings at or near which the metering terminals t are applied. Bridging conduits (not shown) are provided leading to similar metering devices (not shown) at or near the corresponding bearings on the axle or other unsprung parts.

In Fig. 2 there is shown a preferred embodiment of measuring valve unit, illustratively a duplex unit.

The unit comprises a forging or casting 31 having an inlet nipple 32 which is supplied by the inlet pipe 33. The pipe is preferably secured in position in the nipple by an appropriate compression coupling which, in this embodiment, illustratively comprises a wedging sleeve 34 of relatively hard metal encircling the inner end of the pipe and a gland nut 35 threaded into the nipple encircling the pipe and pressing against the corresponding tapered end of the compression sleeve to force the opposite tapered end thereof against a reaction collar 36. The reaction collar preferably has an inturned flange 37 supported by a seat 38 in the unit and serving as a stop for the extreme end of the pipe 33.

The collar 36 serves, moreover, to press against seat 38, the rim of a disk strainer. The strainer preferably comprises a disk 39 of felt having a backing 40 of fine wire mesh, which latter serves as a reinforcement and also to prevent the release of hairs from the felt, which might otherwise be carried into the valve chamber.

The valve forging has barrels 41 extending from opposite ends thereof, each having a beveled valve seat 42 at the end of a corresponding bore 43 of smaller diameter, said bores branching from a well 44 into which the lubricant passes from the strainer 39.

Each of the barrels 41 is provided with a lateral nipple 45 closed by a plug 46 threaded thereinto and hollow as at 47 to afford an air cavity or reservoir. Each of the barrels is closed at its delivery end by a screw plug 48 threaded thereinto and affording a beveled valve seat 49. Means is provided which controls the flow of lubricant from the pipe to the reservoir bell 47 and from the reservoir bell to the bearing, comprising a double-ended plunger 50 urged by a coil compression spring 51 thereabout, which reacts against the inner end of the plug 48 to seat the tapered end 52 thereof against valve seat 42.

In the preferred embodiment, the shank 53 of the valve is of diameter materially smaller than the head 52 and has a tapered end 54 of still smaller diameter, to coact with the beveled seat 49 in the plug 48 and afford a seating surface thereat of very small area.

Preferably the stroke of the valve plunger is in the order of but a few thousandths of an inch. The plug 48 has a suitable compressible gasket 55 interposed therebetween and the barrel end, by which its axial position, and, accordingly, the length of stroke can be delicately adjusted.

Preferably the valve head 52 has a short cylindrical portion 56 extending with small clearance in the corresponding cylindrical portion 57 of the chamber and adjacent said cylindrical portion, there is preferably press-fitted a ring 58 about the shank 53, which affords but small clearance with respect to the wall of the main length of barrel.

In use, it will be understood that the entire pipe line will normally be filled up to the various valve seats 42 at the various units. In operation, the pressure discharge of the pump is transmitted throughout the pipe line and applied at the various valves, the plungers 50 of which are propelled with the initial rush of oil through their short stroke to unseat at their inlets and to cause the small tapered ends 54 thereof, to seat at the outlets 49. This action takes place positively and promptly, especially as the valve 53 has but minute clearance at its inlet end and the annular area of the disk 58 is interposed in the path of liquid flow.

The seated plunger prevents escape of lubricant therebeyond, and, accordingly, the air bell 47 becomes charged as oil is admitted to the measuring valve unit, in the continued application of pressure at the pump.

As the pressure in the bell rises, the rate of oil flow past the valve plunger becomes less and the pressure urging the plunger 53 against its seat 49 is substantially only the hydrostatic seating pressure in the pipe line exerted upon the small effective area of seat 49. This follows because of the fact that all of the surfaces of the reciprocatory valve 50, as shown in Fig. 2, have the same pressure applied thereto with the exception of the portion of the conical end 54 which is in contact with the seat 49.

Spring 51 overcomes this relatively small pressure and the plunger, accordingly, floats between its inlet and its outlet seats during the continued application of pressure at the pump, affording a restricted outlet through a restricted crevice of the order of not more than a few thousandths of an inch to the bearing for lubricant forced about the floating plunger during the rest of the pump stroke.

The outlet port 49 being highly restricted during this operation, offers a resistance to oil flow high compared to that of the length of pipe line and of the strainer and, accordingly, there will be no disproportionately great emission at bearings near the pump. After the pump plunger has reached the end of its stroke and it has completed its discharge, its outlet valve reseats, the flow of oil through the pipe line ceases and the spring 51 then returns the valve plunger to its inlet seat as shown in Fig. 2. Thereafter the air in bell 47 expands and ejects the lubricant to the bearing past the now open outlet seat.

Although not preferred, it is also possible that the valve reciprocate continuously during the pressure application by proper control of the size and shape of the parts of the valve 50. In this case the operation is as follows:

As the pressure increases in the air bell 47 with discharge from the pump S, it approaches that of the oil coming from the conduits 33 and 43 and becomes substantially the same on both sides of the washer or ring 58. But the total force urging the valve 50 to the right against the seat 49 equals the total force on the head 52 plus the force on the left side of the ring 58 minus the force on the right side of the ring 58 plus the force acting on that conical end 54 of the valve 50 which is not pressed against the seat 49. As the pressure on each side of the ring 58 becomes about the same, this total force apparently is less than that of the spring 51, and the spring 51 thus unseats the valve from the seat 49.

After the valve is unseated still more force is exerted to urge the valve 50 to the left, as oil under pressure in the chamber 47 is then acting also on the tip of the conical valve portion 54, which was not receiving pressure when closed against the seat 49. Thus the spring 51 will close valve 52 until the air under pressure in 47 discharges sufficient lubricant to lower the pressure on the lubricant in the chambers 47 and 41 acting to urge the valve 50 to the left, to a point where the oil from the conduit 43 again will move the valve 50 from the seat 57 and against the seat 49. Thus the valve 50 may reciprocate back and forth as long as the pump S is applying pressure. However, generally, the valve will float after the chamber 47 has been charged with a crevice of a few thousandths of an inch between the cone 54 and the seat 49 affording a high restriction passage to the bearings.

It will be understood that if the effective seating area of outlet 49 were so large that the total hydrostatic pressure thereon in operation exceeded the pressure of the pump discharge, the system would become pressure-bound for a considerable period and in such case venting or relief of the pressure on the line is preferably effected at the pump, or some other special venting or relief means are provided, such as for example, one or more drip plug outlets to the bearings or return passageways to the reservoir.

While only clean oil is admitted to the line by reason of the interposition of the filter (not shown) at the pump, any scale entrained by the oil in the pipes or any chips admitted to the pipes in the process of applying the various fittings thereto would be intercepted by the strainer disks 39, so that the lodging of any such solid particles at the seats and the resultant impairment of valve plunger operation is precluded.

In the construction described, the operation would, nevertheless, be reliable even should one or more of the measuring valve plungers fail to move through the entire stroke during pump discharge and to effectively close the beveled outlet seat 49.

By reason of the minute stroke of said plunger, in the order of but a few thousandths of an inch, should such valve only crack off its seat 42 upon the application of pressure, there would be provided between the tapered end 54 and the corresponding beveled seat 49 an annular port, but minute in effective area, as heretofore described, and said port would impose a resistance to flow, so high under the pressure transmitted from the source that lubricant would pass therethrough but slowly.

Accordingly, in such operation, a relatively small predetermined quantity of lubricant would pass directly from the pressure source past outlet 49 to the bearing, the rest entering the bell 47 and compressing the air therein, as in normal operation. Substantially only the measured quantity would pass to the bearing supplied from such valve, part directly during pressure application and the remainder after the foot has been removed from the plunger and the air bell has begun to eject.

The mode of operation last described might occur if, for instance, a particle of dirt became lodged at the outlet seat 49, which might take place if strainer 39 were omitted. Thus, with the present measuring valves, affording but a minute plunger stroke and providing a small outlet valve seat, accurate distribution of lubricant from the various outlets would occur even if the strainer 39 were omitted, provided that the various measuring valves were disposed at uniform level so that drainage of the pipe line would not occur even if particles of dirt should prevent the plungers or some of them from seating normally at their inlet heads 52.

It is preferred, however, to use the specific arrangement shown and described including the strainers by the use of which the limitations as to relative levels of measuring valves, level of reservoir, etc. are removed.

In Fig. 3 there is shown an embodiment of measuring unit which includes a high resistance outlet port functioning throughout the operation of each unit.

In the drawing, similar parts bear the same reference numerals as in Figs. 1 and 2 with exponent "a" however.

The outlet closure plug 48a in this case is seated in substantially fixed position, an ordinary gasket 60 being used instead of the special gasket shown in Fig. 2. An integral tubular extension 61 is provided on the plug 48a of internal diameter but a few thousandths of an inch larger than the shank 53a of the bullet-shaped valve plunger a considerable portion of the length of which at all times extends into said tubular extension.

The main length of the valve plunger is preferably cylindrical and provides no valve at its outlet end and the tapered end 52a thereof is normally pressed against the beveled seat 42a at the inlet end by a coil spring 51a reacting against the shoulder 62 in the plug. Preferably the spring 51a is of strength such that in normal application of pressure at the pump, the valve plunger 53a will crack but slightly off its seat.

The lubricant that enters the valve chamber 41a will divide, some passing under the applied pressure into the bell 47a, to compress the air therein and some being forced through the high resistance minute cylindrical crevice 63 between the shank 53a and tubular extension 61, to pass directly to the bearing. During the discharge of the pump, as the air in the bell 47a becomes compressed and the resistance of said bell to the entry of more oil increases, the proportion of lubricant forced through the restricted outlet 63 increases.

Thus, it will be seen that with the use of fittings as shown in Fig. 3, whether all of the fittings on the line are of that type or whether only some are of that type and the rest of other types herein disclosed or of the drip plug type, the operation is entirely reliable and no excess of lubricant will be forced to one bearing at the expense of lubricant intended for other bearings on the line.

While in the embodiment of Fig. 3, the restricted outlet bore is determined by the gap between the plunger and an encircling wall, I have shown in Fig. 4 an alternative embodiment in which the restricted outlet of the valve is independent of the plunger.

In the fragmentary embodiment shown in the drawing, similar parts are designated by the same reference numerals as in Fig. 2 with ex-exponent "b", however. In this construction, the valve may be generally similar to that shown in Fig. 3, and the outlet plug 48b has a minute longitudinal drip bore 65, for instance, one made with a #80 drill, and of .0135 inch diameter, and of length sufficient to interpose a high resistance to flow. As an additional safeguard, to avoid the possibility of such minute drip bore becoming clogged with a particle of dirt or a chip, it is preferred to provide in advance thereof in a socket 66, a felt strainer plug 67 which as in other embodiments, may be backed with a disk 68 of fine mesh metal screen.

The spring 51b in Fig. 4 (like the spring 51a of Fig. 3) may be strong enough to keep the piston 53b from closing against the port 66.

It is to be understood, of course, that the measuring valves of the present application may be utilized in systems in parallel with measuring valves of other constructions, such as are shown in application Serial No. 596,856, filed October 25, 1922 (Patent 2,017,848); at the end of a progressive system, such as shown in application Serial No. 728,719, filed June 2, 1934; in parallel with drip plug restrictions such as shown in application Serial No. 580,668, now Patent No. 1,975,920 and also in Patents Nos. 1,632,772, 1,734,026 and 1,734,027; said drip plugs being employed either to feed a bearing and/or to provide a return feed to the reservoir, whereby pressure may be relieved in the lines to assure more prompt return of the measuring valves and/or to prevent pressure locking of the line.

The present application is a continuation in part of application Ser. No. 9,544, filed February 16, 1925, now Patent No. 2,003,281 and Figs. 2, 3 and 4 of this application correspond to Figs. 2, 3 and 4 of said prior application.

Although the lubricating installation of the present invention is particularly described in an application to chassis lubricating systems, it is apparent that it may be broadly utilized for the lubrication of other machinery.

By the expression "drip plug" as utilized in the specification and accompanying claim is meant a high restriction metering fitting having a narrow crevice through which oil passes to the bearings, the restricting effect of the crevice being tremendously higher than the restricting effect of the piping and bearings, so that it will predominantly control the proportionment of lubricant among the bearings. These drip plugs, if desired, may also be provided with inlet strainers and check valves, either spring seated or flow seated.

It is to be understood that many alternative and varying constructions may be made pursuant to the broad aspects of the present invention, as above pointed out, and it is intended to cover and include all such alternatives and variations as come within the scope of the appended claim.

What is claimed is:

A centralized lubricating system comprising a source of lubricant pressure, a pressure-transmitting piping system supplied therefrom, measuring valve units at the various outlets thereof leading to bearings, each of said units having an inlet, an outlet and a storage chamber, a double-ended valve controlling communication with respect to said chamber and having a minute stroke of the order of a few thousandths of an inch between said inlet and said outlet and normally spring-pressed toward said inlet, said valve piece including a disk substantially filling the corresponding bore, for rapid plunger operation through its minute stroke upon application of pressure at the source, in order to seal the outlet, and a strainer in advance of said valve intercepting any scale or chip entrained with the lubricant, in order to prevent possible interference with the operation of the valve by lodging of a solid particle in the path of movement thereof.

GEORGE BIJUR.
*Executor of the Estate of Joseph Bijur, Deceased.*